US009313428B2

(12) United States Patent
Borremans et al.

(10) Patent No.: US 9,313,428 B2
(45) Date of Patent: Apr. 12, 2016

(54) IMAGING SENSORS (71) Applicant: IMEC VZW, Leuven (BE)

(72) Inventors: Jonathan Borremans, Lier (BE); Koen De Munck, Leuven (BE)

(73) Assignee: IMEC VZW, Leuven (BE)

( * ) Notice: Subject to any disclaimer, the term of this patent is extended or adjusted under 35 U.S.C. 154(b) by 0 days.

(21) Appl. No.: 14/574,383

(22) Filed: Dec. 17, 2014

(65) Prior Publication Data

US 2015/0189199 A1 Jul. 2, 2015

(30) Foreign Application Priority Data

Dec. 26, 2013 (EP) .................................... 13199615

(51) Int. Cl.
*H01L 27/148* (2006.01)
*H04N 5/359* (2011.01)
*H04N 5/355* (2011.01)
*H04N 5/357* (2011.01)
*H04N 5/3745* (2011.01)

(52) U.S. Cl.
CPC ........... *H04N 5/3591* (2013.01); *H04N 5/3559* (2013.01); *H04N 5/3575* (2013.01); *H04N 5/3598* (2013.01); *H04N 5/37452* (2013.01)

(58) Field of Classification Search
CPC ............. H01L 27/14609; H04N 5/359; H04N 5/3575; H04N 5/3591; H04N 5/3559; H04N 5/3598
USPC .......................................................... 257/239
See application file for complete search history.

(56) References Cited

U.S. PATENT DOCUMENTS

| 2005/0224843 | A1  | 10/2005 | Boemler |
| 2010/0208115 | A1  | 8/2010  | Sugawa et al. |
| 2011/0085066 | A1* | 4/2011  | Sugawa et al. ............... 348/302 |
| 2012/0193516 | A1  | 8/2012  | Bogaerts |
| 2012/0256077 | A1  | 10/2012 | Yen et al. |
| 2013/0194472 | A1  | 8/2013  | Takeda |

OTHER PUBLICATIONS

European Search Report, European Patent Application No. 13199615.9, dated Feb. 18, 2014.

(Continued)

*Primary Examiner* — Tu-Tu Ho
(74) *Attorney, Agent, or Firm* — McDonnell Boehnen Hulbert & Berghoff LLP (57) ABSTRACT

Described herein is a pixel readout circuit which provides readout at two sensitivity levels depending on the amount of electrons generated by a pixel photodiode in the circuit. A floating diffusion capacitor operates to store charge up to a saturation value determined by its capacitance and an overflow capacitor is provided in an overflow region for storing charge above the saturation value of the floating diffusion capacitor. Readout at a high sensitivity level is provided when the floating diffusion capacitor is not saturated and readout at a lower sensitivity level is provided when there is saturation and subsequent overflow to the overflow region. Connection of the floating diffusion capacitor to the overflow capacitor shares the charge over the combined capacitance of the two capacitors and provides readout at a lower sensitivity without loss of charge.

10 Claims, 6 Drawing Sheets

(56) References Cited

OTHER PUBLICATIONS

Wang, Xinyang et al., "An 89dB Dynamic Range CMOS Image Sensor With Dual Transfer Gate Pixel", Paper No. R36, Dec. 31, 2011, XP055097725, Retrieved from Internet: URL:http://www.imagesensors.org/Past Workshops/2011 Workshop/2011 Papers/R36_Wang_DualTG.pdf, 4 pages.

Choi, Jaehyuk, "An Energy-Efficient Adaptive CMOS Image Sensor", Paper No. FP-158, The University of Michigan, Jun. 12, 2013, Retrieved from the Internet: URL:http://deepblue.lib.umich.edu/bitstream/handle/2027.42/97883/jaechoi_1.pdf?sequence=1, 174 pages.

Akahane, Nana et al., "A Sensitivity and Linearity Improvement of a 100 dB Dynamic Range CMOS Image Sensor Using a Lateral Overflow Integration Capacitor", 2005 Symposium on VLSI Circuits Digest of Technical Papers, Jun. 16-18, 2005, pp. 62-65.

Sugawa, Shigetoshi et al., "A 100dB Dynamic Range CMOS Image Sensor Using a Lateral Overflow Integration Capacitor", ISSCC 2005/Session 19/Imagers/19.4, 2005 IEEE International Solid-State Circuits Conference, Feb. 8, 2005, pp. 352-353 and 603.

Akahane, Nana et al., "Optimum Design of Conversion Gain and Full Well Capacity in CMOS Image Sensor With Lateral Overflow Integration Capacitor", IEEE Transactions on Electron Devices, vol. 56, No. 11, Nov. 2009, pp. 2429-2435.

\* cited by examiner

IMAGING SENSORS

CROSS-REFERENCE TO RELATED APPLICATION

Priority is claimed to European Patent Application No. 13199615.9 filed Dec. 26, 2013, the contents of which are incorporated by reference.

FIELD OF THE DISCLOSURE

The present disclosure relates to improvements in or relating to imaging sensors, and is more particularly, although not exclusively, concerned with an apparatus and method of reading out imaging sensors having pixels and a method of reading out such pixels.

BACKGROUND OF THE DISCLOSURE

High sensitivity and wide dynamic range are key requirements for many imaging applications, but it is difficult to design a CMOS image sensor with very low read noise combined with high full well charge.

In a typical 3T or pinned photodiode (PPD) 4T pixel structure, the electrons are converted into voltage using a capacitor. The gain is determined from the equation:

$$V = \frac{Q}{C} = n\frac{q}{C} = n \cdot CVF$$

where V is the voltage, Q is the charge in coulombs, C is the capacitance of the conversion capacitor, q is elementary charge, n is the number of electrons, and CVF the conversion factor expressed in (micro)volt per electron. CVF is the measure for the voltage generated by one signal electron and is inversely proportional to the conversion capacitor C.

For low noise, a large conversion factor (CVF) is required. A large CVF reduces the impact of the typical dominant noise sources, being either the source follower or subsequent elements in the readout chain. Those noise sources are generated in the voltage domain, are expressed in volts, and, are, in first instance, not related to the CVF. However, their input related noise contribution expressed in electrons, scales down directly with CVF. To conclude, low noise means large CVF which means a small conversion capacitor needs to be provided.

However, the voltage on the conversion capacitor is limited by the supply voltage. Therefore, the larger the CVF, the fewer electrons fit on the conversion capacitor. A high CVF effectively thus limits the full well capacity, and it is difficult to obtain a satisfactory trade-off between high conversion gain and high full well capacity. This is also described in US-A-2005/0224843.

In an article by Nana Akahane, Satoru Adachi, Koichi Mizobuchi, and Shigetoshi Sugawa entitled "Optimum Design of Conversion Gain and Full Well Capacity in CMOS Image Sensor With Lateral Overflow Integration Capacitor", IEEE TRANSACTIONS ON ELECTRON DEVICES, VOL. 56, NO. 11, NOVEMBER 2009, pages 2429 to 2435, a circuit is proposed in which both a high conversion gain and a full well capacity are achieved at the same time in a CMOS image sensor by utilising a lateral overflow integration capacitor. In particular, this article addresses the issues of limits for both high conversion gain and full well capacity as determined by the signal-to-noise ratio at a switching point between a low light signal and a bright light signal.

US-A-2008/0266434 discloses a pixel circuit in which an overflow capacitor is attached directly to a floating diffusion node via an additional transistor. This connection effectively raises the capacitance of the capacitor and hence limits the conversion factor. One problem with this approach is the inability to perform true correlated double sampling in combination with low frequency noise on the low gain channel if needed. The low gain reset sample would need to be taken at the start of the integration, the sample signal at the end of the integration gives rise to a large low frequency noise. Additionally, there is an inability to perform floating diffusion node sharing and low noise binning.

Similar problems arise in the circuitry described in US-A-2007/0278536, although one of the driving lines is switched off.

A dual transfer gate pixel arrangement is described in an article by Xinyang Wang, Bram Wolfs, Guy Meynants, and Jan Bogaerts, entitled "An 89 dB Dynamic Range CMOS Image Sensor with Dual Transfer Gate Pixel", International Image Sensor Workshop 2011, Paper Number R36, in which low noise and high dynamic range is obtained in which the complete charge is transferred in one operation consisting of four steps depending on the level of illumination. The pixel arrangement comprises first and second floating diffusion regions, each region having a different conversion gain and its own dedicated transfer transistor, where the first floating diffusion region has a higher conversion gain than the second floating diffusion region and hence a lower capacity for receiving charge. The transfer 'ON' phase for the first transfer transistor is always activated first to allow charge to be transferred to the first floating diffusion region. For low levels of illumination where the first floating diffusion region has sufficient capacity to receive all the charge, there is no need to activate the second transfer transistor for the second floating diffusion region, and, on readout, the output signal is transferred from the first floating diffusion only. For high levels of illumination where the first floating diffusion becomes over-saturated (e.g., its capacity is not sufficient to receive all the charge from the pixel), both floating diffusion regions are utilised and the output signal is provided from the second floating diffusion region. In this latter case, the transfer 'ON' phase for each floating diffusion region is arranged to overlap. Again, the first transfer transistor is activated for the transfer 'ON' phase followed by the second transfer transistor to allow the remaining charge to be transferred to the second floating diffusion region of larger capacity. The first transfer resistor is then switched off and its charge is transferred to the second floating diffusion region. The second transfer transistor is switched off and the complete charge transfer operation is effected from the second floating diffusion region.

The conflict between high conversion gain and pixel saturation at low signal levels needs to be resolved.

SUMMARY OF THE DISCLOSURE

It is therefore an object of the present disclosure to provide for high pixel full well capacity whilst still allowing the pixel to be read out in a high sensitivity mode.

In accordance with one aspect of the present disclosure, there is provided a method of obtaining an output signal from a pixel photodiode which includes a floating diffusion region and an overflow diffusion region, the method comprising the steps of:

transferring electrons from the pixel photodiode to the floating diffusion region;

receiving electrons in the floating diffusion region from the pixel photodiode;

converting the received electrons into at least one charge value corresponding to the received electrons in the floating diffusion region to provide at least one output signal by:

(i) transferring electrons from the floating diffusion region to the overflow diffusion region;

(ii) reading out from the floating diffusion region at a first sensitivity level a first output signal, the first output signal corresponding to a first charge value;

(iii) converting the received electrons in the overflow region into a second charge value;

(iv) re-distributing the first and second charge values over both the floating diffusion region and the overflow diffusion region;

(v) converting the re-distributed charge value on the combined floating diffusion and overflow diffusion regions into a second output signal; and (vi) reading out the second output signal from the floating diffusion region at a second sensitivity level, the second output signal corresponding to the redistributed charge value and the second sensitivity level being lower than the first sensitivity level; and reading out the at least one output signal.

Advantageously, by transferring electrons from the floating diffusion region to the overflow diffusion region, the method of the present invention has the advantage that it is still possible to readout the total charge corresponding to the electrons generated by the pixel photodiode without loss of information, but only sensitivity, if the charge generated is sufficiently large to cause the floating diffusion region to become saturated.

It will be appreciated that, prior to transferring electrons from the pixel photodiode to the floating diffusion region, the electrons accumulated on the pixel photodiode are integrated.

Converting the received electrons into at least one charge value may further comprises the step of sampling a first reset level value for the first output signal prior to reading out the first output signal. In this case, reading out the first output signal comprises using the first reset level value to compensate for at least one of: noise and offset in the first output signal.

Optionally, converting the received electrons into at least one charge value may further comprise the step of sampling an optional reset level value prior to transferring electrons from the floating diffusion region to the overflow diffusion region. In this embodiment, reading out the second output signal comprises using the optional reset level value to compensate for at least one of: noise and offset in the second output signal. In this embodiment, the optional reset level value may be stored Preferably, the method further comprises sampling a further reset level value after reading out the second output signal. In this embodiment, reading out the second output signal comprises using the further reset level value to compensate for at least one of: offset and fixed pattern noise. This provides double data sampling for the lower sensitivity (or gain) channel.

BRIEF DESCRIPTION OF THE DRAWINGS

For a better understanding of the present disclosure, reference will now be made, by way of example, to the accompanying drawings in which.

DESCRIPTION OF THE DISCLOSURE

The present disclosure will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

The terms "upper", "lower", "top", "bottom", "vertical" and "horizontal" as used herein refer to the orientation of the embodiments illustrated in drawings and is not intended to be limiting to a specific configuration.

Figure 1:
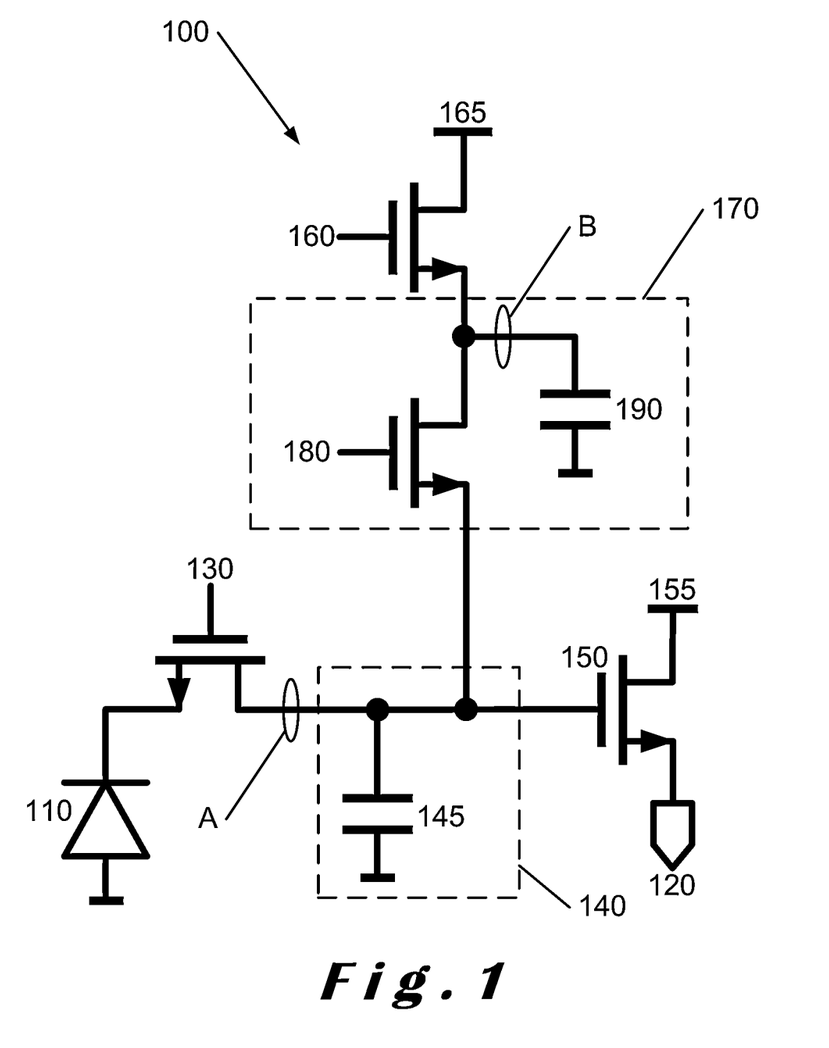
FIG. 1 illustrates a pixel readout circuit in accordance with the present disclosure.

Referring initially to FIG. 1, a pixel circuit 100 is shown. It will be appreciated that each pixel within an image sensor will have such a circuit.

The pixel circuit 100 comprises a pixel photodiode 110 connected to an output 120 by means of a transfer (TX) gate or TX transistor 130, a floating diffusion (FD) region 140 and a readout gate or readout transistor 150. The FD region 140 is effectively implemented by an FD capacitor 145. Readout gate or readout transistor 150 is connected to the output 120 as shown and to a voltage supply 155. A reset (RST) gate or RST transistor 160 is provided which is connected to another voltage supply 165 and to the FD region 140 via an overflow (OF) or charge reservoir 170. In one embodiment, the voltage supply 165 may be the same as voltage supply 155 using the same physical interconnecting line in the pixel array (not shown). The OF or charge reservoir 170 is effectively implemented by an OF gate or OF transistor 180 and an OF capacitor 190, as shown. Nodes A and B are shown between the pixel photodiode 110 and FD region 140, and between the RST gate or RST transistor 160 and the OF gate or OF transistor 180 within the OF or charge reservoir 170, respectively. The operation of the circuit 100 will be described in more detail below with reference to FIGS. 2 and 3.

In effect, the circuit 100 provides an additional reservoir, in the form of OF capacitor 190 within the OF or charge reservoir 170, for electrons when the FD region 140 becomes saturated. The FD capacitor 145 has a smaller capacitance value than the OF capacitor 190, and hence a higher conversion gain with low noise, enabling a readout in a high-sensitivity mode. The overflowing electrons are transferred to the OF capacitor 190 where they are stored until the OF capacitor 190 is connected to the FD capacitor 145 to provide a lower conversion gain than that of the FD capacitor 145 alone as will be described in more detail below. This enables the readout of large signals after saturation of the FD capacitor 145.

A row select transistor (not shown) is provided for the selection of individual pixels for readout. However, this is not described in detail here as it is not relevant to the operation of the present invention.

Figure 2:
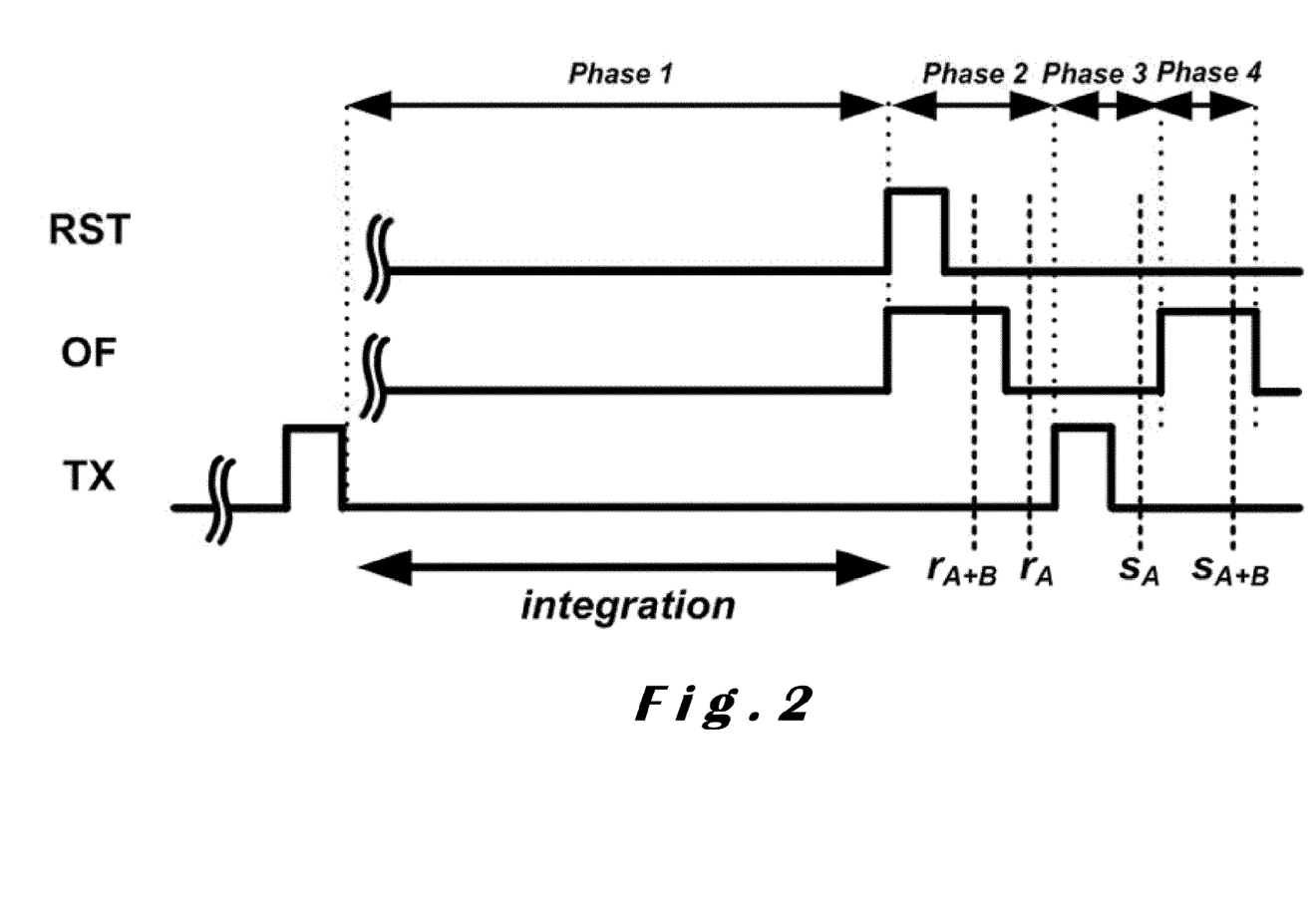
FIG. 2 illustrates a timing diagram for signals at certain points within the readout circuit of FIG. 1 for an operational cycle having four phases.

Referring now to FIG. 2, a timing diagram is shown for the operation of the pixel circuit 100 with the signal levels for the TX gate or TX transistor 130, the RST gate or RST transistor 160 and the OF gate or OF transistor 180. The signal levels are shown for four phases in each operational cycle of the pixel photodiode 110.

Phase 1 relates to a signal integration phase, and, in a current frame, provides for the conversion of light incident on the pixel photodiode 110 into electrons. Here, all gates are set low as they are all open. The pixel photodiode 110 integrates electrons that are generated by the light or photons detected in a standard 4T pixel operation. During readout of the previous frame, the pixel photodiode 110 is reset by closing TX gate or transistor 130 during charge transfer to the FD region in that previous frame. With excessive incident light on the pixel photodiode 110, the operation of the RST gate or transistor 160, the OF gate or transistor 180 and the TX gate or transistor 130 can be tuned to allow overflow once the pixel photodiode 110 is full as an "anti-blooming" measure, e.g., the collection of an overflow of charge or electrons from the FD node A connected to the pixel photodiode 110.

In Phase 2, the OF gate or transistor 180 and the RST gate or transistor 160 are closed (e.g., turned on), to set the FD region 140 to the supply voltage 165. Subsequently, the RST gate or transistor 160 is opened (e.g., turned off). Optionally, at this point, an optional reset level of the combined capacitance of the FD capacitor 145 and the OF capacitor 190 can be sampled, readout via a pixel column output (not shown), and temporarily stored. The remainder of the charge on the combined FD capacitor 145 and the OF capacitor 190 consists of some offset and noise due to sampling. The offset depends on the supply voltage 165, the threshold voltage of the RST gate or transistor 160, and the capacitive division of the parasitic capacitance of the RST gate or transistor 160 with respect to the combined capacitance of the FD capacitor 145 and the OF capacitor 190. The larger the combined capacitance, the closer the reset level will be to the supply voltage. The reset level value, $r_{A+B}$, can be expressed as:

$$r_{A+B} = V_{A+B}(t_1) = OS_{A+B} + \sqrt{\frac{kT}{C_{FD-OF}}}$$

where $OS_{A+B}$ is the offset on the combined FD and overflow nodes, and $$\sqrt{\frac{kT}{C_{FD-OF}}}$$

is the reset noise due to sampling. As the latter is a noise, it will be different in each frame but constant within a frame once sampled.

The OF gate or transistor 180 is then opened (e.g., switched off), and a first reset level is sampled from the FD capacitor 145 only to the output 120. The offset depends on $V_{A+B}$, the threshold voltage of the OF gate or transistor 180, and the capacitive division of the parasitic capacitance of the OF capacitor 190 with respect to the FD capacitor 145. The larger the capacitance of the FD capacitor 145, the closer this reset level will be to $V_{A+B}$. The reset noise level is approximately given by $$\sqrt{\frac{kT}{C_{FD}}}.$$

The remainder on node A is some offset and noise due to sampling. This reset level value $r_A$, can be expressed as:

$$r_A = V_A(t_2) = OS_A + \sqrt{\frac{kT}{C_{FD}}}$$

where $OS_A$ is the offset on the FD node, and $$\sqrt{\frac{kT}{C_{FD}}}$$

is the noise due to sampling.

In Phase 3, after sampling the reset level(s) $r_A$ (and $r_{A+B}$ if used), the TX gate or transistor 130 is closed (i.e., turned on), which empties the charge on the pixel photodiode 110 and aims to put all charge on the FD capacitor 145. If there is little charge, then a voltage gain will be produced:

$$V = \frac{Q_{FD}}{C_{FD}}$$

where $Q_{FD}$ and $C_{FD}$ are the charge on and capacitance of respectively the FD capacitor 145.

If the charge is very large, node A will become very low, making the OF gate or transistor 180 conduct and thereby allowing charge to overflow into and be stored in the OF capacitor 190. This overflow charge is not lost. A signal $S_A$ is measured at node A:

$$S_A = V_A(t_3) = OS_A + \sqrt{\frac{kT}{C_{FD}}} + V_{CHARGE}$$

where $V_{CHARGE}$ is the voltage due to the charge on the pixel photodiode 110.

By subtracting $r_A$ from $S_A$, allowances can be made for the offset and the noise. If the result is threshold low enough (i.e., below a predetermined threshold), then the input signal from the pixel photodiode 110 can be measured with high sensitivity and there is no need to use the OF region 170. However, if the result is too large, some charge would have transferred to the OF region 170 and the large signal on node B will need to be read out.

Clearly, the OF gate or transistor 180 needs to be specifically tuned to accommodate this mode of operation and to allow a certain charge overflow. The means that the 'OFF' state gate voltage needs to be different from 0V, or that the OF gate or transistor 180 needs to be designed with a specific low-threshold voltage.

Phase 4 provides for the re-distribution of the total charge over the FD capacitor 145 and the OF capacitor 190. The OF gate or transistor 180 is closed (e.g., made to conduct), and the total charge is distributed over both capacitors. The total larger capacitance results in more charge capacity but also a lower sensitivity. For this signal, $S_{A+B}$:

$$S_{A+B} = V_{A+B}(t_4) = OS_{A+B} + \sqrt{\frac{kT}{C_{FD-OF}}} + V_{CHARGE\_TOTAL}$$

where $V_{CHARGE\_TOTAL}$ is the voltage due to the shared total charge from the pixel photodiode 110.

It is to be noted that the offset values $OS_A$ and $OS_{A+B}$ are different voltages which are due to the difference in capacitive action of the RST and OF gates or transistors. These values also contain fixed pattern noise (FPN) information for the pixel photodiode 110 identifying a temporally constant lateral non-uniformity for the imaging system of which the pixel photodiode forms a part.

Similarly, the reset noise levels $$\sqrt{\frac{kT}{C_{FD}}}$$

and $$\sqrt{\frac{kT}{C_{FD-OF}}}$$

are also different, with the latter in the voltage domain being smaller than the former, as the total capacitance is larger. However, in the charge domain, the reset noise for the low gain case is larger than for the high gain case for the same reason. Whether this reset noise is acceptable will depend on the difference in capacitance value from $C_{FD}$ to $C_{FD-OF}$ and the application specification. In most cases, the reset noise of the low gain channel is likely to be negligible.

Nevertheless, in case the $$\sqrt{\frac{kT}{C_{FD-OF}}}$$

reset level is stored, the reset noise, the offset, and the low frequency noise could be (partially) eliminated by subtracting $r_{A+B}$ from $S_{A+B}$ in a way similar to the high gain measurement.

Alternatively, the reset level from the high gain measurement could be used to perform a pseudo-correlated double sampling (CDS) operation in the voltage domain before gain compensation, (e.g., $S_{A+B}-r_A$). This operation removes low frequency noise as well as the reset and source follower (SF) induced FPN, but keeps reset noise with overflow induced FPN and offset.

Figure 3:
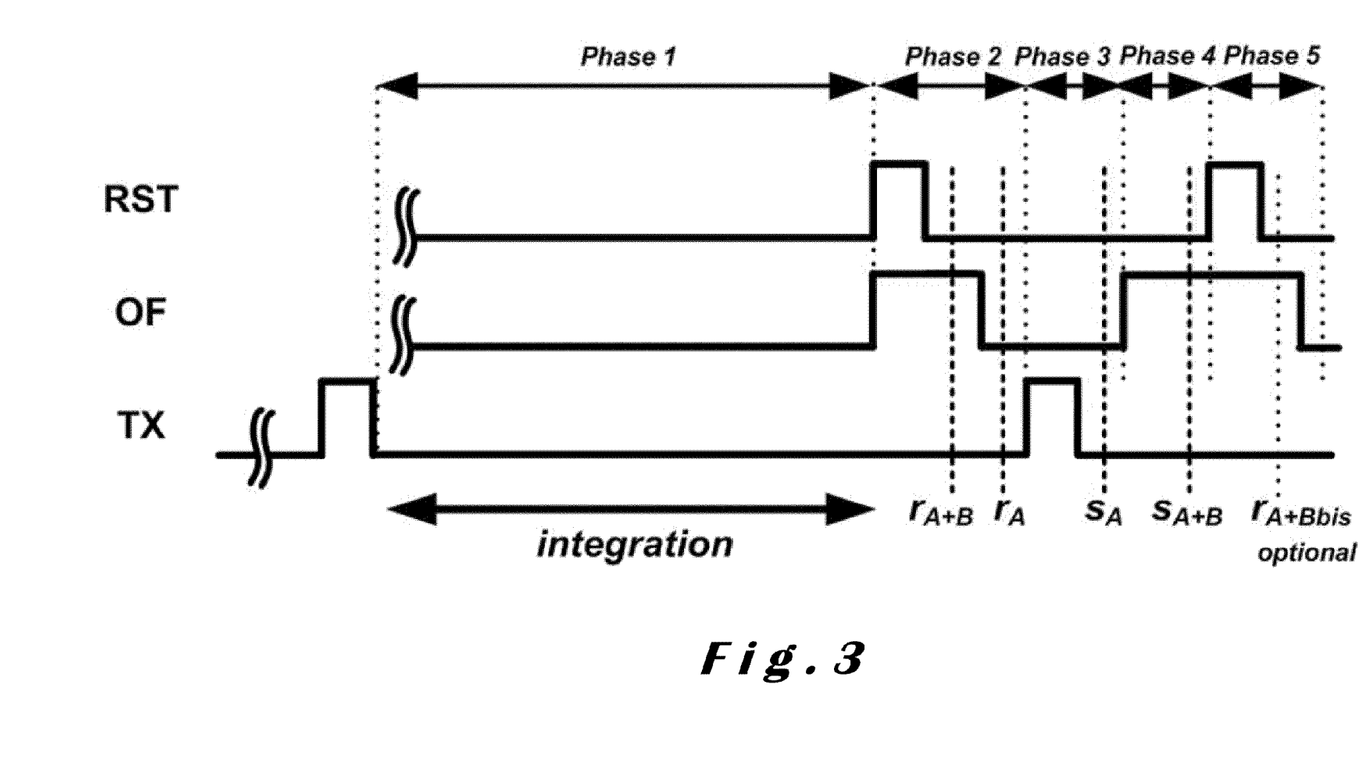
FIG. 3 is similar to FIG. 2 but illustrating an optional fifth phase.

As shown in FIG. 3, the timing diagram includes an optional Phase 5 in which a new reset value is sampled. Here, nodes A and B are reset again and measured, and the new or further reset value, $r_{A+Bbis}$, is given by:

$$r_{A+Bbis} = V_{A+B}(t_5) = OS_{A+B} + \sqrt{\frac{kT}{C_{FD-OFbis}}}$$

where $OS_{A+B}$ corresponds to the offset and FPN as before and $$\sqrt{\frac{kT}{C_{FD-OFbis}}}$$

corresponds to the reset noise.

The reset noise is now uncorrelated to the signal and will not be cancelled, but the offset and FPN are cancelled. In other words, double data sampling (DDS) is performed for the low gain channel.

The signal can then be defined as $S_{A+B}-r_{A+Bbis}$ which corresponds to the full lower sensitivity signal, including twice the reset noise. In most cases, this will be an acceptable and preferred operation mode. In such a case, the original reset value will not need to be stored.

Example

If the maximum charge is 100000 electrons (e⁻), $C_{FD}$=1 fF and $C_{OF}$=10 fF, then at 10000 e⁻, the voltage on the FD capacitor 145 would be 1.6V (using $$V = \frac{Q_{FD}}{C_{FD}}$$

and where $Q_{FD}$=1.6*10⁻¹⁹*10000 e⁻C and $C_{FD}$=1 fF) and more voltage could not be supported. In this case, the maximum readable charge is 10000 e⁻. The sensitivity is the given by:

$$\frac{\text{Voltage}}{\text{number of electrons}} = \frac{1.6}{1*10^5} = 160 \ \mu V/e^-$$

Therefore, in order to obtain 1e⁻ of noise, one needs to have readout circuits of 160 μV, and above 10000 e⁻, the charge needs to overflow into the OF capacitor 190.

With a $C_{OF}$=10 fF, at 100000 e⁻, the voltage on the OF capacitor 190 would be 1.6V (where $Q_{OF}$=1.6*10⁻¹⁹*100000 e⁻C and $C_{OF}$=10 fF). In this case, the maximum readable charge is 100000 e⁻ and the sensitivity is 16 μV/e⁻. Here, in order to obtain 1e⁻ of noise, one needs to have readout circuits of 16 μV. This is far more difficult to achieve. However, as the signal is very large, the signal is also very noisy due to shot noise (shot noise in electrons being equal to the square root of the signal).

Figure 4:
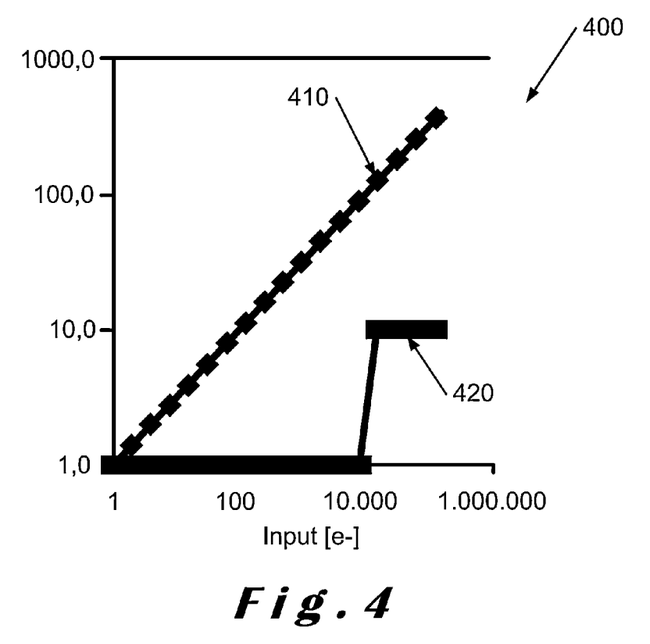
FIG. 4 illustrates a noise-electron characteristic for the pixel photodiode readout circuit shown in FIG. 1 where the capacitance of the overflow region is 10 times that of the floating diffusion region.

FIG. 4 illustrates a noise-input signal characteristic 400 for an input signal in electrons. The shot noise is indicated at 410 and read noise is indicated at 420, assuming a readout noise of 160 μV under the above conditions. As can be seen, the shot noise is always greater than the readout noise.

Figure 5:
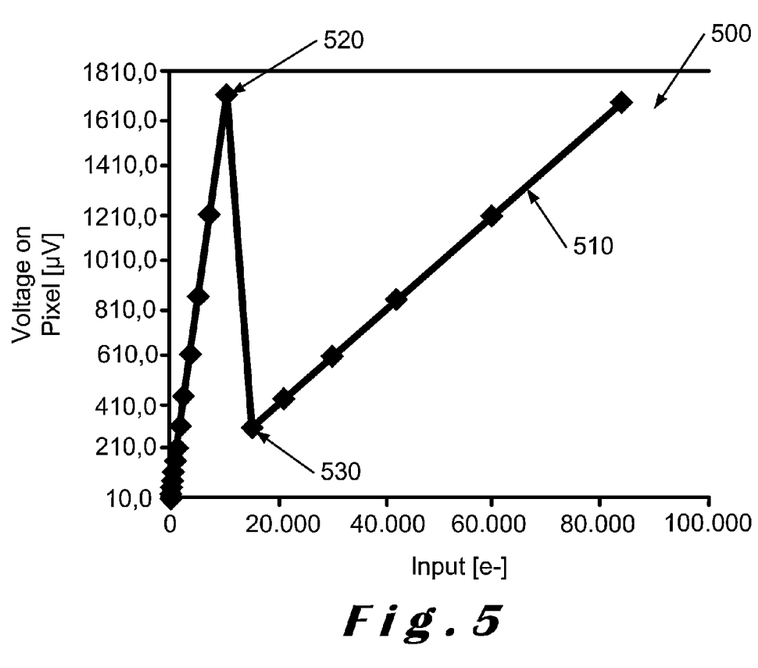
FIG. 5 illustrates a voltage-electron characteristic for the pixel photodiode readout circuit shown in FIG. 1.

FIG. 5 illustrates a voltage-input signal characteristic 500 for a pixel photodiode in terms of an input signal in electrons. The characteristic 500 includes the relationship between the voltage on the pixel photodiode and the charge it generates as shown at 510. A peak is shown at 520 which corresponds to a charge of 10000 e⁻ as given in the Example above and the end of the high sensitivity readout. A corresponding trough is shown at 530 which relates to a charge of more than 10000 e⁻ (again as given in the Example above) and which indicates the start of the readout at a lower sensitivity. The peak at 520 corresponds to the maximum charge sustained by the FD capacitor 145 and the trough at 530 corresponds to the transfer of charge to the OF capacitor 190. This results in lower sensitivity for larger signals, which is acceptable due to the shot noise (as described above with reference to FIG. 4.

Figure 6:
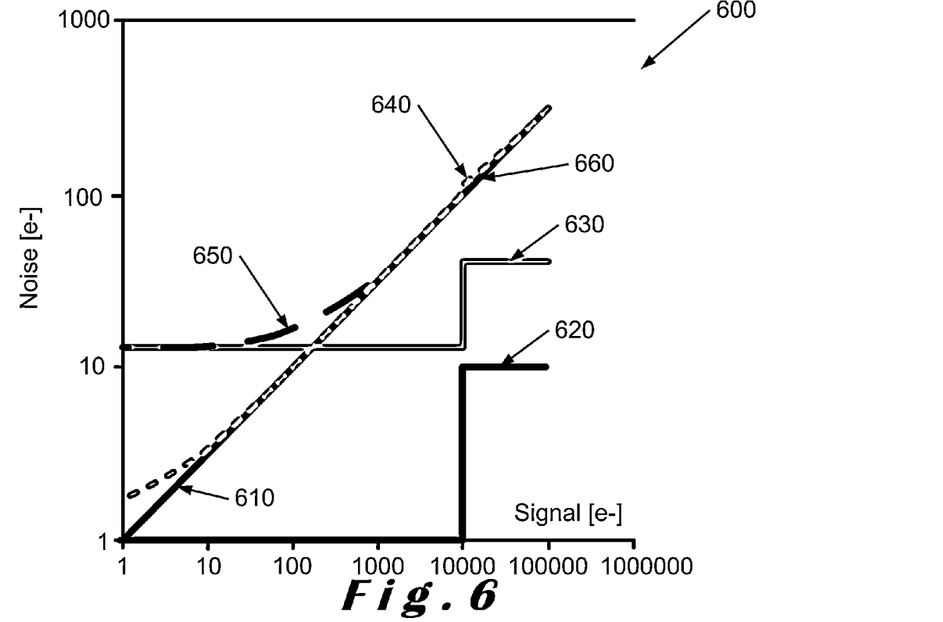
FIG. 6 illustrates noise-electron characteristics for elements of the pixel photodiode readout circuit shown in FIG. 1.

FIG. 6 illustrates a noise-input signal characteristic 600 for operation at high sensitivity, that is, up to 10000 e⁻ as given in the Example above. In FIG. 6, line 610 corresponds to shot noise; line 620 corresponds to the read noise; line 630 corresponds to the reset noise; line 640 (dotted line) corresponds to total noise for CDS at high gain; line 650 corresponds to total noise with no CDS; and line 660 (dotted line) corresponds to total noise using full CDS (indistinguishable from line 640 for the used set of parameters).

Figure 7:
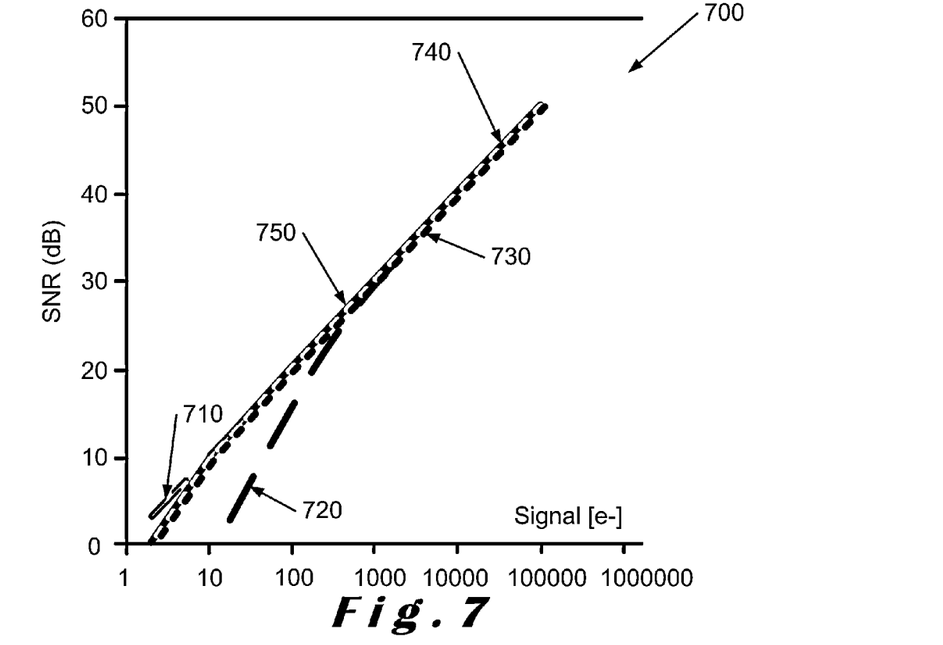
FIG. 7 illustrates a signal-to-noise ratio-electron characteristic for the pixel photodiode readout circuit shown in FIG. 1.

FIG. 7 illustrates a signal-to-noise ratio (SNR)-input signal characteristic 700 for operation at the high sensitivity, that is, up to 10000 e⁻. In FIG. 7, line 710 corresponds to an ideal SNR; line 720 corresponds to SNR with no CDS; line 730 (darker dotted line) corresponds to CDS only at high gain; line 740 (solid line) corresponds to full CDS; and line 750 (lighter dotted line) corresponds to CDS only at high gain with DDS at low gain.

Figure 8:
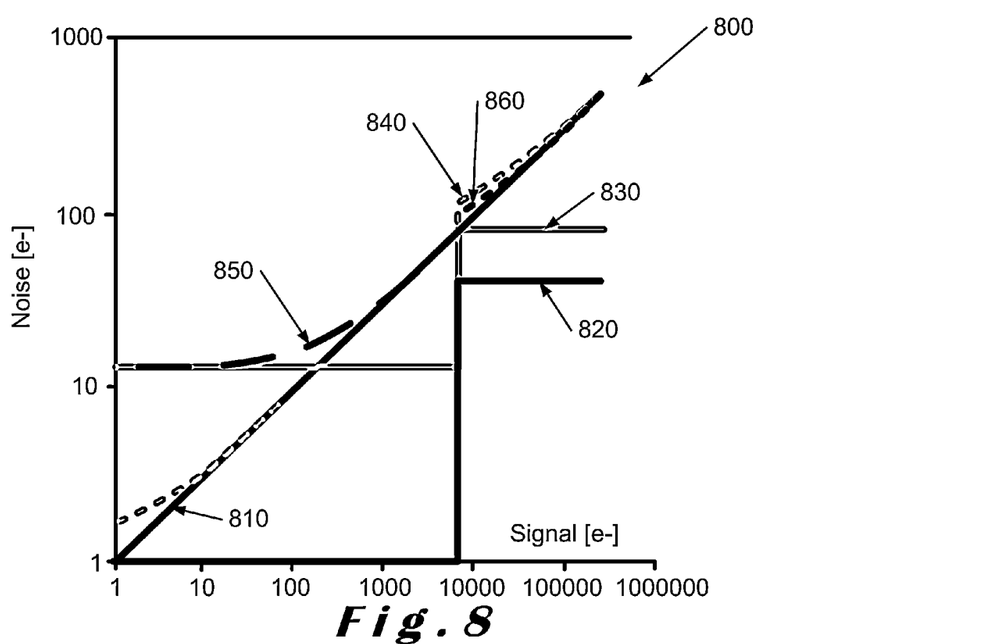
FIG. 8 is similar to FIG. 6 but for a different offset capacitance value.

FIG. 8 is similar to FIG. 6 where line 810 corresponds to shot noise; line 820 corresponds to the read noise; line 830 corresponds to the reset noise; line 840 (lighter dotted line) corresponds to total noise for CDS at high gain; line 850 corresponds to total noise with no CDS; and line 860 (dotted line) corresponds to total noise using full CDS (at lowest signal levels line 840 masks line 860).

Figure 9:
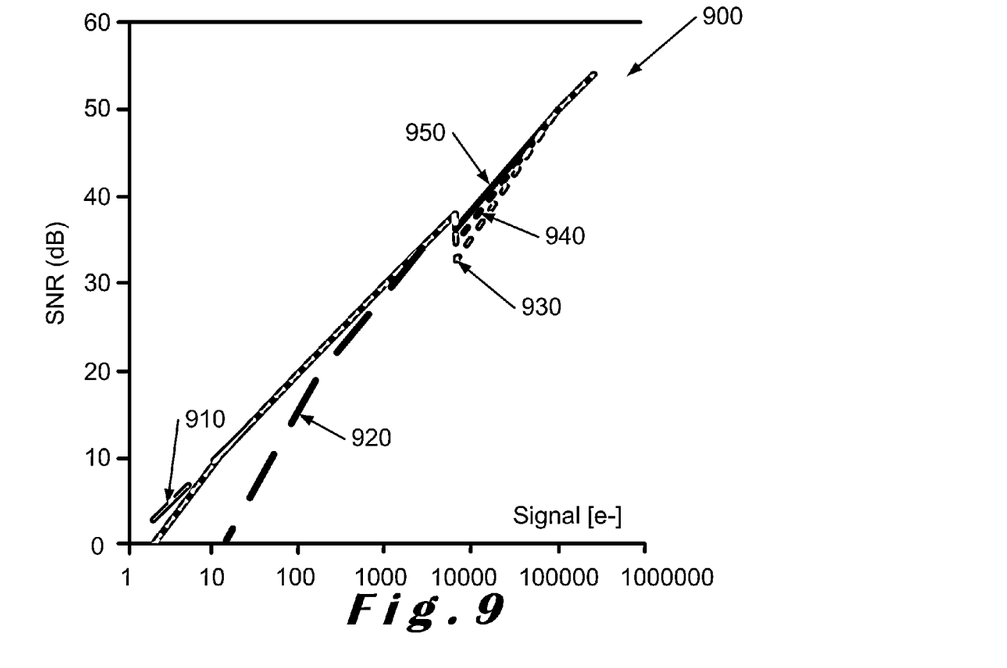
FIG. 9 is similar to FIG. 7 but for a different offset capacitance value.

FIG. 9 is similar to FIG. 7 where line 910 corresponds to an ideal SNR; line 920 corresponds to SNR with no CDS; line 930 (lighter dotted line) corresponds to CDS only at high gain; line 940 (darker dotted line) corresponds to full CDS; and line 950 (solid line) corresponds to CDS only at high gain with DDS at low gain. A small dip is observed at the point where the gain channel is changed from a high sensitivity to a lower sensitivity.

The SNR dip can vary, for example, in the case of a swing of 1V and capacitance values of 1 fF and 40 fF, the SNR dip can be between 1 to 5 dB depending on the handling of the reset level.

The operation of the circuit of the present invention has the advantage that a higher dynamic range can be provided with the additional cost of one additional transistor and capacitor for each pixel photodiode in a photodiode array.

Two readout channels are provided when the charge is at a level where the FD capacitor becomes saturated, each channel having a different sensitivity. Both channels share the same amplifier path making FPN subtraction easier to process.

Offset and reset noise cancellation can be provided for in a reset sample subtraction process.

Using the circuit of the present invention, performing CDS in combination with 1/f noise cancellation is possible.

FD sharing is possible which allows the sharing of all pixel circuitry with the exception of the TX gate or transistor and the pixel photodiode itself.

Pixel binning may be provided to increase further the dynamic range with an associated trade-off with loss in resolution.

The invention of the present disclosure has the advantage that "anti-blooming" functionality is provided without loss of sensitivity and without having to know beforehand the amount of "blooming" or overflow which will be needed. When overflow is needed, extra information is provided about the incoming light signal with increased dynamic range.

Such a pixel photodiode circuit 100 may be utilized in any image sensor to produce the advantages mentioned above.

Although the present disclosure has been described with reference to a 4T pixel arrangement, it can also be used with a 3T pixel arrangement where the transfer gate is removed.

It will readily be appreciated that although the concept has been explained for electrons as signal carriers and NMOS transistors, equivalently holes as signal carriers and PMOS transistors could be used as well driven in the appropriate way.

It will readily be appreciated that although one specific embodiment has been described, other implementations are also possible.

What is claimed is:

1. A method for operating a light detection circuit comprising a first node, a second node, and a photodiode, the method comprising:
   accumulating charge carriers via the photodiode;
   while the photodiode is accumulating the charge carriers:
      (i) connecting a reset voltage to the second node and connecting the second node to the first node;
      (ii) isolating the second node from the reset voltage and isolating the first node from the second node, thereby generating a reference voltage at the first node; and
      (iii) sampling the reference voltage;
   transferring, from the photodiode, a first portion of the charge carriers to the first node and a second portion of the charge carriers to the second node;
   sampling a first output voltage at the first node represented by the first portion of the charge carriers;
   distributing the second portion of the charge carriers between the first node and the second node by connecting the first node to the second node; and
   sampling a second output voltage represented by the first portion of the charge carriers and the second portion of the charge carriers distributed between the first node and the second node.

2. The method of claim 1, further comprising determining a first corrected output voltage by comparing the reference voltage to the first output voltage.

3. The method of claim 1,
   wherein the reference voltage is a first reference voltage,
   wherein the second node is isolated from the reset voltage before the first node is isolated from the second node,
   wherein isolating the second node from the reset voltage generates a second reference voltage at both the first node and the second node, the method further comprising:
   sampling the second reference voltage prior to isolating the first node from the second node.

4. The method of claim 3, further comprising determining a second corrected output voltage by comparing the second reference voltage to the second output voltage.

5. The method of claim 3, further comprising storing the second reference voltage and the second output voltage.

6. The method of claim 1, further comprising storing the reference voltage and the first output voltage.

7. The method of claim 1, further comprising:
   reconnecting the reset voltage to the second node, thereby connecting the first node to the reset voltage;
   re-isolating the first node and the second node from the reset voltage, thereby generating a third reference voltage at both the first node and the second node; and
   sampling the third reference voltage.

8. The method of claim 7, further comprising determining a corrected output voltage by comparing the third reference voltage to the second output voltage.

9. A light detection circuit comprising a photodiode, a first node, a second node, a first switch, a second switch, and a third switch, the light detection circuit being configured to perform functions comprising:
  accumulating charge carriers via the photodiode;
  while the photodiode is accumulating the charge carriers:
    (i) connecting, via the first switch, a reset voltage to the second node and connecting, via the second switch, the second node to the first node;
    (ii) isolating, via the first switch, the second node from the reset voltage and isolating, via the second switch, the first node from the second node, thereby generating a reference voltage at the first node; and
    (iii) sampling the reference voltage;
  transferring, via the third switch from the photodiode, a first portion of the charge carriers to the first node and a second portion of the charge carriers to the second node;
  sampling a first output voltage at the first node represented by the first portion of the charge carriers;
  distributing, via the second switch, the second portion of the charge carriers between the first node and the second node by connecting the first node to the second node; and
  sampling a second output voltage represented by the first portion of the charge carriers and the second portion of the charge carriers distributed between the first node and the second node.

10. A light detection circuit comprising: a first node, a second node, and
  means for accumulating charge carriers;
  means for, while the means for accumulating the charge carriers is accumulating the charge carriers:
    (i) connecting a reset voltage to the second node and connecting the second node to the first node;
    (ii) isolating the second node from the reset voltage and isolating the first node from the second node, thereby generating a reference voltage at the first node; and
    (iii) sampling the reference voltage;
  means for transferring, from the means for accumulating the charge carriers, a first portion of the charge carriers to the first node and a second portion of the charge carriers to the second node;
  means for sampling a first output voltage at the first node represented by the first portion of the charge carriers;
  means for distributing the second portion of the charge carriers between the first node and the second node by connecting the first node to the second node; and
  means for sampling a second output voltage represented by the first portion of the charge carriers and the second portion of the charge carriers distributed between the first node and the second node.

* * * * *